(12) United States Patent
Lee et al.

(10) Patent No.: US 7,092,320 B1
(45) Date of Patent: Aug. 15, 2006

(54) MEDIUM HANDLER AND ORGANIZER

(75) Inventors: John S. Lee, Coon Rapids, MN (US); David J. Suden, Minneapolis, MN (US); Westin W. Nelson, Dayton, MN (US); Phillip C. Salisbury, Golden Valley, MN (US); Darrin William Piekkola, Ramsey, MN (US)

(73) Assignee: Rimage Corporation, Minneapolis, MN (US)

( * ) Notice: Subject to any disclaimer, the term of this patent is extended or adjusted under 35 U.S.C. 154(b) by 0 days.

(21) Appl. No.: 09/501,434

(22) Filed: Feb. 10, 2000

(51) Int. Cl.
*G11B 17/22* (2006.01)

(52) U.S. Cl. ............... 369/30.32; 369/30.34; 369/30.33; 400/120.16; 400/120.17; 720/619

(58) Field of Classification Search ............ 369/30.43, 369/30.45, 30.49, 30.32, 30.55, 30.57, 30.61, 369/200, 30.22, 30.23, 30.24; 347/171, 197, 347/222, 104, 106; 101/35, 4, 41; 709/223; 358/1.6, 1.18; 235/383, 385, 472.01, 462.45; 400/120.16, 120.17; 720/619
See application file for complete search history.

(56) References Cited

U.S. PATENT DOCUMENTS

| | | | | |
|---|---|---|---|---|
| 5,165,340 A | * | 11/1992 | Karlyn et al. ............... 101/115 |
| 5,411,588 A | * | 5/1995 | Diepens et al. ............. 118/666 |
| 5,485,436 A | * | 1/1996 | Forget et al. ............ 369/30.52 |
| 5,504,688 A | * | 4/1996 | Letourneau .................... 101/4 |
| 5,518,325 A | * | 5/1996 | Kahle .......................... 156/384 |
| 5,592,596 A | * | 1/1997 | Balsom ..................... 358/1.18 |
| 5,734,629 A | * | 3/1998 | Lee et al. ................ 369/30.34 |
| 5,844,593 A | * | 12/1998 | Proffitt et al. ............... 347/262 |
| 5,913,652 A | * | 6/1999 | Zejda ....................... 198/346.2 |
| 5,946,216 A | * | 8/1999 | Hollerich .................... 206/307 |
| 5,995,459 A | * | 11/1999 | Kappel et al. ........... 369/30.55 |
| 6,041,703 A | * | 3/2000 | Salisbury et al. ............. 101/37 |
| 6,074,031 A | * | 6/2000 | Kahle ........................ 101/38.1 |
| 6,075,758 A | * | 6/2000 | Wu ......................... 369/30.52 |
| 6,141,298 A | | 10/2000 | Miller |
| 6,285,648 B1 | * | 9/2001 | Philipps ..................... 369/200 |
| 6,321,649 B1 | * | 11/2001 | Vangen et al. ................ 101/35 |
| 6,337,842 B1 | * | 1/2002 | Wolfer et al. ............ 369/30.57 |

* cited by examiner

*Primary Examiner*—William Korzuch
*Assistant Examiner*—Kim-Kwok Chu
(74) *Attorney, Agent, or Firm*—Leffert, Jay & Polglaze, P.A.

(57) ABSTRACT

A compact disc processing system allows for more efficient processing of compact discs. The system included a transporter mechanism that can grip and transport more than one compact disc at a time. As such, a second disc can be gripped while a first disc is being processed. This eliminates the need to wait for processing operations, such as recording or printing, to be completed prior to transporting the second disc. The system includes a gripping head with at least two vacuum controlled mechanisms for selectively gripping the discs. A disc organizer can be provided which includes trays that can be used to store discs for selective retrieval. The organizer eliminates the difficulty encountered in locating a processed disc from a large stack of discs.

11 Claims, 7 Drawing Sheets

MEDIUM HANDLER AND ORGANIZER

TECHNICAL FIELD OF THE INVENTION

The present invention relates generally to storage medium processing and in particular the present invention relates to a medium handler and organizer.

BACKGROUND OF THE INVENTION

Compact discs are used as a storage medium for digital information. The data is stored on the compact disc by varying the optical characteristics of the disc. This digital information can be any type of data, such as, but not limed to, audio, image, photo and/or video information. In other words, the digital data stored on a compact disc can vary from disc to disc. Different types of compact discs can be provided, a traditional type of compact disc is manufactured using a plastic mold operation. Each compact disc manufactured using the same mold contains the same digital information. As such, large production runs of compact discs which contain the same information, such as a musical composition, are manufactured in an economical manner by using a molding process.

A different type of compact disc which is commercially available is a recordable compact disc. This type of disc is manufactured such that it does not contain data thereon, but can be programmed after it is manufactured. The optical characteristics, therefore, of the compact disc are modified after it is fabricated depending upon the data that is stored on the disc. In the context of the present invention, it is to be understood that reference to a compact disc (CD) includes and encompasses Compact Disc Recordable "CD-R", Compact Disc Readable "CD-RW", CD-ROM, CD-PROM, Digital Versatile Disc "DVD", DVD-R, DVD-RAM, DVD-RW, or any disc for data storage.

To identifying the data stored on a compact disc, a label is often printed on one side of the compact disc. For large manufacturing runs of a common compact disc, a silk screen process is often used to apply the label to the compact disc. For small production runs of compact discs, such as those using recordable compact discs, a silk screen operation may not be economical. A custom printing operation, therefore, can be employed to print a custom label on each compact disc. See for example U.S. Pat. No. 5,734,629 entitled "CD Transporter" issued Mar. 31, 1988 for a description of a compact disc transporter which can be used to move a compact disc between a data recorder and a printer. This transporter moves a single compact disc at a time between stations and places completed compact discs in a stack.

For the reasons stated above, and for other reasons stated below which will become apparent to those skilled in the art upon reading and understanding the present specification, there is a need in the art for the compact disc handling apparatus and method which more efficiently transports compact discs between stations and provides easy access to pre-determined compact discs which have been processed.

SUMMARY OF THE INVENTION

The above mentioned problems with medium handling devices and other problems are addressed by the present invention and will be understood by reading and studying the following specification.

In one embodiment, a compact disc processing system comprises a printer for printing indicia on a first compact disc, a recorder for recording information on the first compact disc, and a transporter carriage for holding the first compact disc and moving the first compact disc between the recorder and printer. The transporter carriage comprises a rotatable gripping head having first and second gripping locations each for respectively holding the first and a second compact disc simultaneously.

In another embodiment, the system further includes a compact disc organizer. The organizer comprises a plurality of disc trays, and a selection mechanism coupled to the plurality of disc trays for selectively moving the plurality of disc trays such that the first compact disc can be placed on the selected disc tray for temporary storage.

Other embodiments are described herein, and it is manifestly intended that this invention be limited only by the claims and the equivalents thereof.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
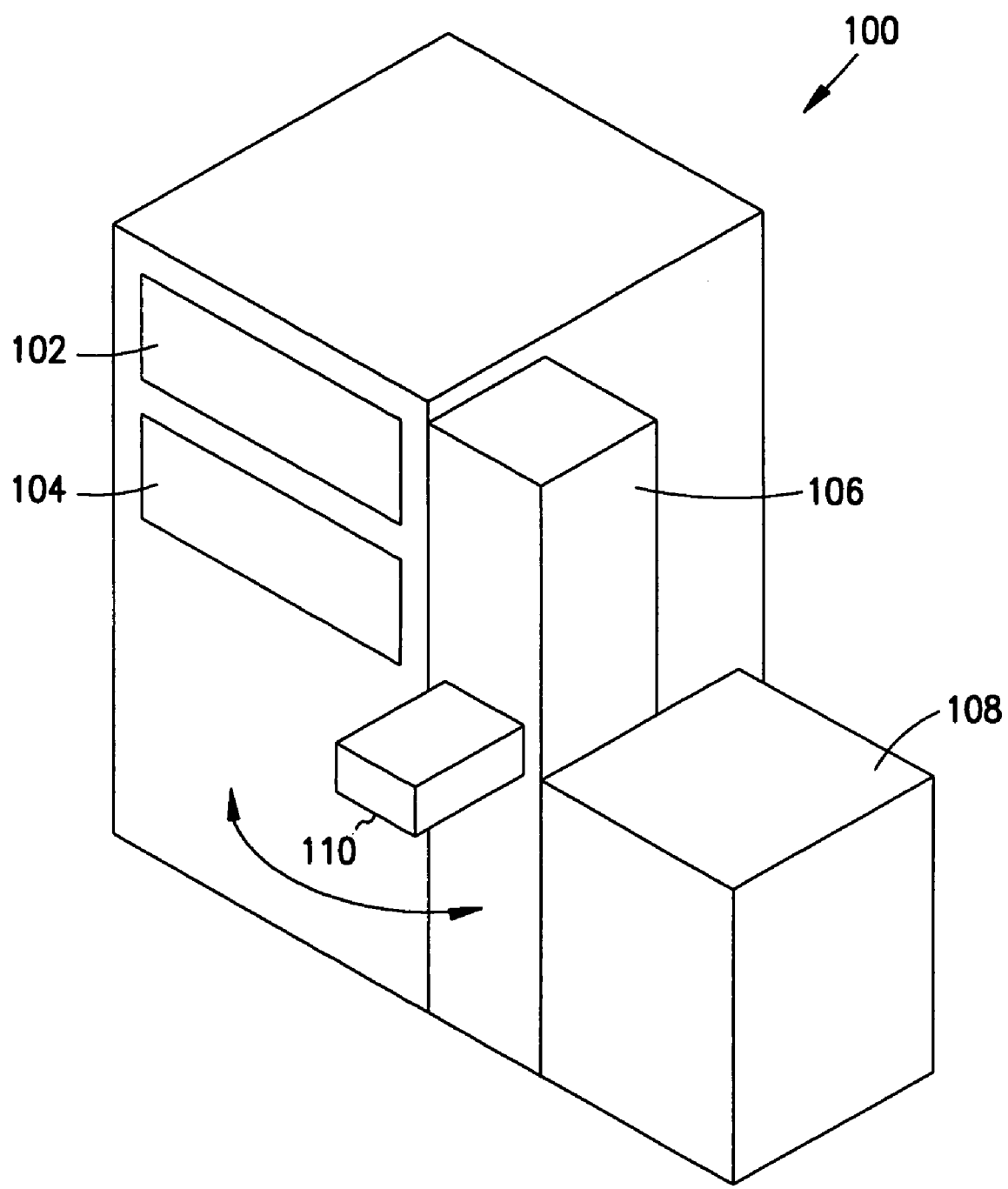
FIG. 1 illustrates a block diagram of a compact disc handler of the present invention.

Referring to FIG. 1, a simplified block diagram is illustrated of one embodiment of a compact disc handler 100 of the present invention. The block diagram is provided to help understand the relationship of components in embodiments of the invention, and a detailed description of embodiments of the components are described below. The compact disc handler includes at least one compact disc recording device 102, a printer 104 for printing label-type information on a compact disc, a transporter device 106 for moving compact discs, and an optional disc organizer 108. The recorder can be any type of commercially available recorder intended to record data on an optically readable medium, such as a compact disc. Likewise, the printer can be any type of printer intended to print information or images on a compact disk. The printer can operate using any known printing method, such as but not limited to thermal transfer, ink jet or laser printing. As described in greater detail below, the transporter device includes a gripping head 110 which can selectively pick up a compact disc. The gripping head has the ability to grip more than one compact disc at a time to increase the number of compact discs which can be processed over a given period of time. Also explained in greater detail below, is the disc organizer which allows for the easy storage and retrieval of compact discs.

Figure 2:
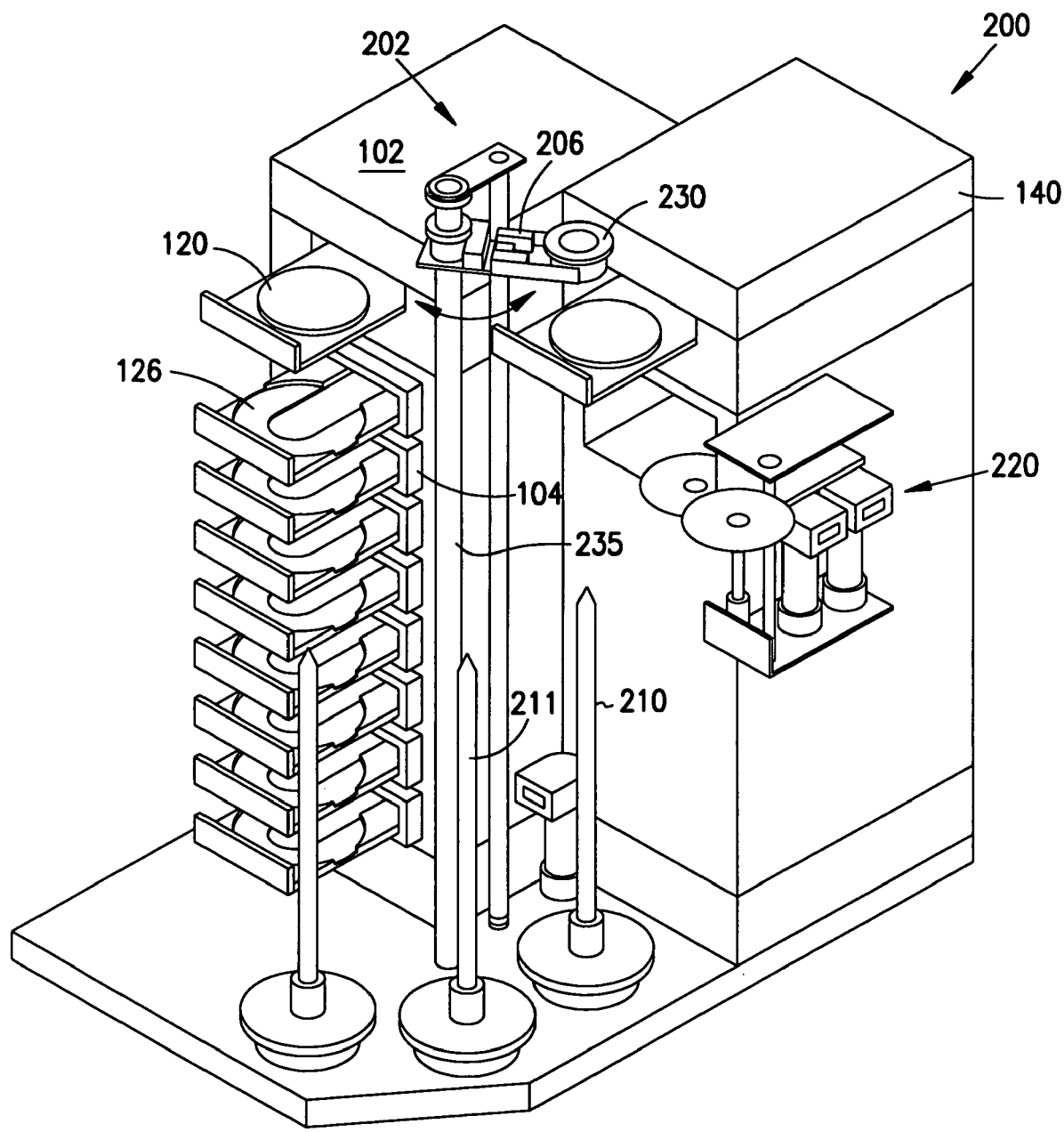
FIG. 2 illustrates a detailed diagram of a compact disc handler of the present invention.

Referring to FIG. 2, one embodiment of a compact disc handler 200 is described in greater detail. The compact disc handler includes at least one printer 102 which has an extendable drawer that is adapted to receive a compact disc. That is, the drawer extends to an open position to allow a compact disc to be placed in the drawer. The drawer can retract into the printer so that a label or other image can be printed on the compact disc. In one embodiment, an optional second printer 140 can be provided. The handler also includes one or more data recorders 104. Like the printer, each recorder has an extendable drawer which is adapted to receive a compact disc. In one embodiment, some of the recorders can be vertically aligned such that their respective drawers art in substantial alignment when they are in their extended positions.

The compact disc handler includes at least one compact disc station 210. In one embodiment, the station includes a vertically extending rod which is sized to fit within a central opening provided in the compact discs. As known to those skilled in the art, commercially available compact discs have a circular central opening. As such, compact discs can be stacked in axial alignment by placing them over the vertical rod. Numerous compact disc stations can be provided, and the present invention is not limited to a particular number of stations. For example, the compact disc handler can include two compact disc supply stations for providing unrecorded compact discs, and a station for stacking completed (re-corded and printed) compact discs. In another embodiment, a compact disc station can be provided for collecting compact discs which are rejected during processing.

The compact disc handler includes a compact disc transporter mechanism 202. The compact disc transporter includes a pickup arm 206 and a gripping head 230. The transporter mechanism also includes a vertically extending shaft(s) 235. The pickup arm is coupled to the shaft to allow the pickup arm to move in the vertical direction during operations. As such, the transporter mechanism includes a motor to provide vertical movement to the pickup arm. In one embodiment, shaft 235 can be formed with a concentric interior and exterior shafts that engage the pickup arm. The interior shaft is rotated to either raise or lower the pickup arm, and the exterior shaft is rotated to rotate the pickup arm through a horizontal plane around an axis of the vertically extending shaft. As illustrated in FIG. 2, this allows the gripping head to be vertically aligned with the drawers of the printer and recorders, and also vertically aligned with the compact disc stations. In alternate embodiments, different gear structures can be used, including a belt and pulley configuration.

Prior compact disc transporter devices were designed to pickup a single compact disc and transport it to the recorder for storing data thereon. After data is stored on the compact disc, the transporter moves the compact disc from the recorder to the printer. While the compact disc was in the printer the transporter could pick up a blank compact disc and place it in the recorder. In other words, prior compact disc transporters worked in a serial manner. The amount of time used by the transporter mechanism can be relatively significant. The present invention reduces this time by providing a transporter mechanism which can grip two, or more, compact discs at one time. As explained in greater detail below, the transporter can select a blank compact disc, pickup a compact disc from the recorder and replace it with the blank compact disc without delaying recording while the transporter returns to a supply station. The amount of time, therefore, which was needed to move the transporter can be absorbed by other processing operations to improve the overall operating efficiency of the compact disc handler.

Figure 3:
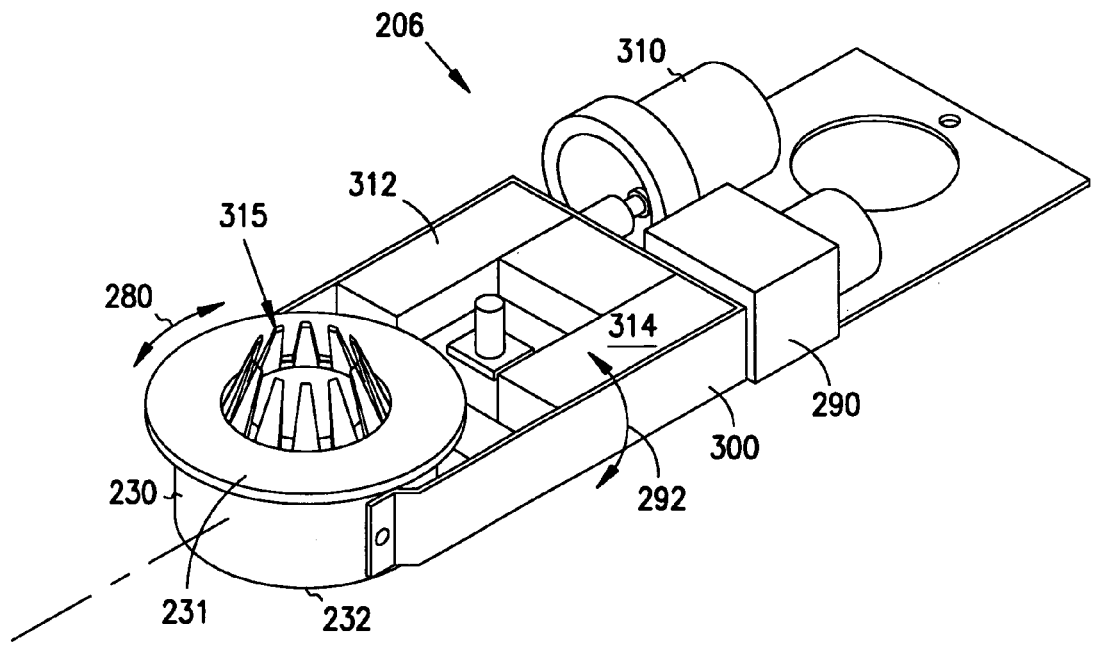
FIG. 3 is a gripping head of the compact disc handler of the present invention.
Figure 4:
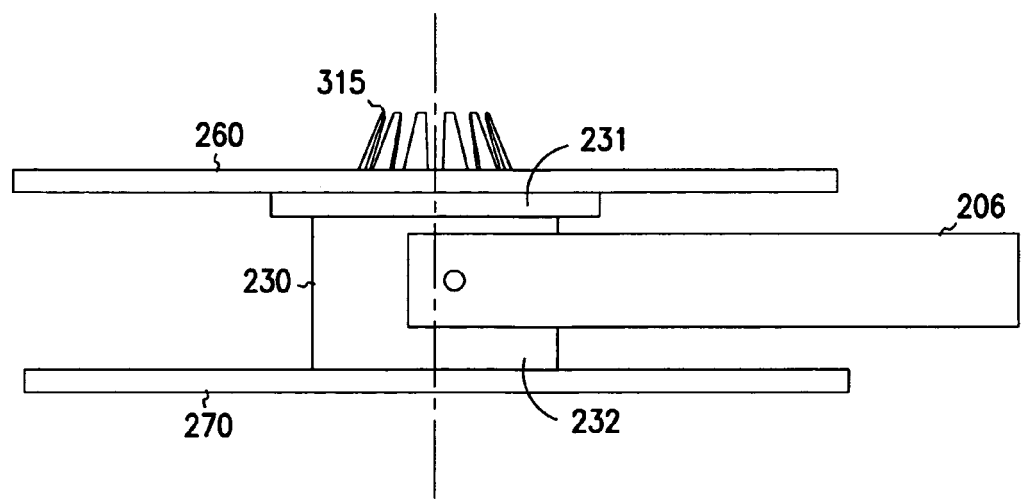
FIG. 4 illustrates the gripping head of FIG. 3 holding two discs.

One embodiment of pickup arm 206 and gripping head 230 are illustrated in FIG. 3. The gripping head is designed to hold up to two discs 260 and 270 (see FIG. 4)using vacuum mechanisms. The gripping head is also designed to allow the rotation 280 of at least one disc about its central axis. Other gripping mechanisms are contemplated for gripping compact discs, such as mechanical fingers which grab a central opening of the compact discs. As such, the present invention should not be limited to a vacuum controlled gripping head. For example, the outside diameter of the disc can be used to grip the disc.

A wrist motor 290 may be included in the pickup arm for rotating 292 the gripping head and end portion 300 of the arm attached to the gripping head. This motion allows for a horizontal rotation about an axis of the arm. A vacuum pump 310 can be included in the pickup arm for selectively activating a vacuum(s) to pick up discs. It will be appreciated that the vacuum can be located anywhere in the system and is not limited to the location described. The gripping head can hold a compact disc with sufficient force to allow for a controlled rotation of the compact disc about its axis, as explained below, for assistance in the printing operation.

One side of the gripping head includes an alignment feature 315 which assists in maintaining axial alignment between the gripping head and a compact disc 260. This feature also assists in alignment for sensors to detect an index mark, as explained below. This alignment feature can be provided on both sides, but is limited to one side in this embodiment. The alignment feature includes a plurality of deflectable fingers which extend from the gripping head. During operation, the fingers extend into a central opening provided in the discs. This feature is helpful in maintaining accurate placement of a compact disc in the printer, which can be important for accurate printing.

It will be appreciated by those skilled in the art, that a subsequent personalized image, or indicia, printed on the top surface of the compact disc may be printed in an area which does not include preprinted information. That is, if this subsequent printed indicia occupies the same location as preprinted indicia, the composite image could be visually undesirable, if not unreadable. It may, however, be desirable to print a subsequent image over a prior image. The preprinted image may include a background field which provides a visual contrast for subsequently printed material. To insure proper positioning relative to pre-printed material, the rotational position of the disc and/or the pre-printed image can be controlled by rotating the gripping head, as explained above.

A photo-optical sensor (not shown) can be used to detecting an image located on the compact disc, such as printed images or an index mark, see U.S. patent application Ser. No. 08/944,315, filed Oct. 6, 1997 entitled "COMPACT DISC PRINTING SYSTEM AND METHOD" and incorporated herein. Alternately, the sensor can be a camera positioned in a location having a field of view of the compact disc. Other sensing devices known to those skilled in the art are also contemplated.

In operation, the gripper head allows for processing of multiple compact discs at one time. Prior processing techniques transported a blank compact disc to a recorder, after data had been written to the disc, the compact disc was moved to a printer to receive a label. After the compact disc was moved to the printer, the transporter moved to a compact disc supply to pick up a new blank disc to be placed in the recorder. As stated above, the steps of retrieving a new disc slows the processing down. It will be appreciated by those skilled in the art with the benefit of the present detailed description that maintaining active recorders can increase processing volume. That is, reducing the amount of time that a compact disc is not in a recorder and/or printer can increase production volumes.

The present invention reduces inactive recorder time by having a new blank compact disc available when recording is completed on a prior disc. In operation, gripper head 230 is moved to a supply location 210 while the recorder is busy. A new disc is picked up by gripper 232 of gripper head 230, the gripper head moves to the recorder, and the gripper head is rotated 180 degrees about a horizontal axis so that open gripper 231 of gripper head 230 is staged above the drawer of the recorder. When the recorder is completed and the drawer extends to an open position, gripper 231 then picks up the recorded disc from the drawer. The gripper head then rotates 180 degrees and places the blank disc in the recorder drawer. The gripper head can then remove a printed disc from the printer using open gripper 232 and replace it with the recorded disc from gripper 231. By allowing for movement of two discs simultaneously, the present invention reduces the amount of time that either the printer or recorder are waiting for the gripper head to move between disc locations. The gripper head can be rotated at any time after a disc has been gripped. That is, the gripper head can rotate simultaneously with movement of the arm.

It will be appreciated that the order of operation can be changed without departing from the present invention. As such, a label can be printed on a disc and then the disc can be placed in a recorder. In operation, gripper head 230 is moved to a supply location 210 while the printer is busy. A new disc is picked up by gripper 232 of gripper head 230, the gripper head moves to the printer, and the gripper head is rotated 180 degrees about a horizontal axis so that open gripper 231 of gripper head 230 is staged above the drawer of the printer. When the printer is completed and the drawer extends to an open position, gripper 231 then picks up the printed disc from the drawer. The gripper head then rotates 180 degrees and places the blank disc in the printer drawer. The gripper head can then remove a recorded disc from the recorder using open gripper 232 and replace it with the printed disc from gripper 231.

One embodiment of the present invention can include a disc verifier or data reader. The verifier can be used to check data written to a disc medium for accuracy. This feature can be incorporated into the above described system and process. A reader can be used to read or extract data from the disc. Such data may be used to further process the disc. For example, a disc may contain label information to instruct the printer. Further, a disc may contain information indicating what additional data needs to be recorded on the disc. Thus, the present invention can be used to perform different operations on a data medium in any number of different sequences.

Figure 5:
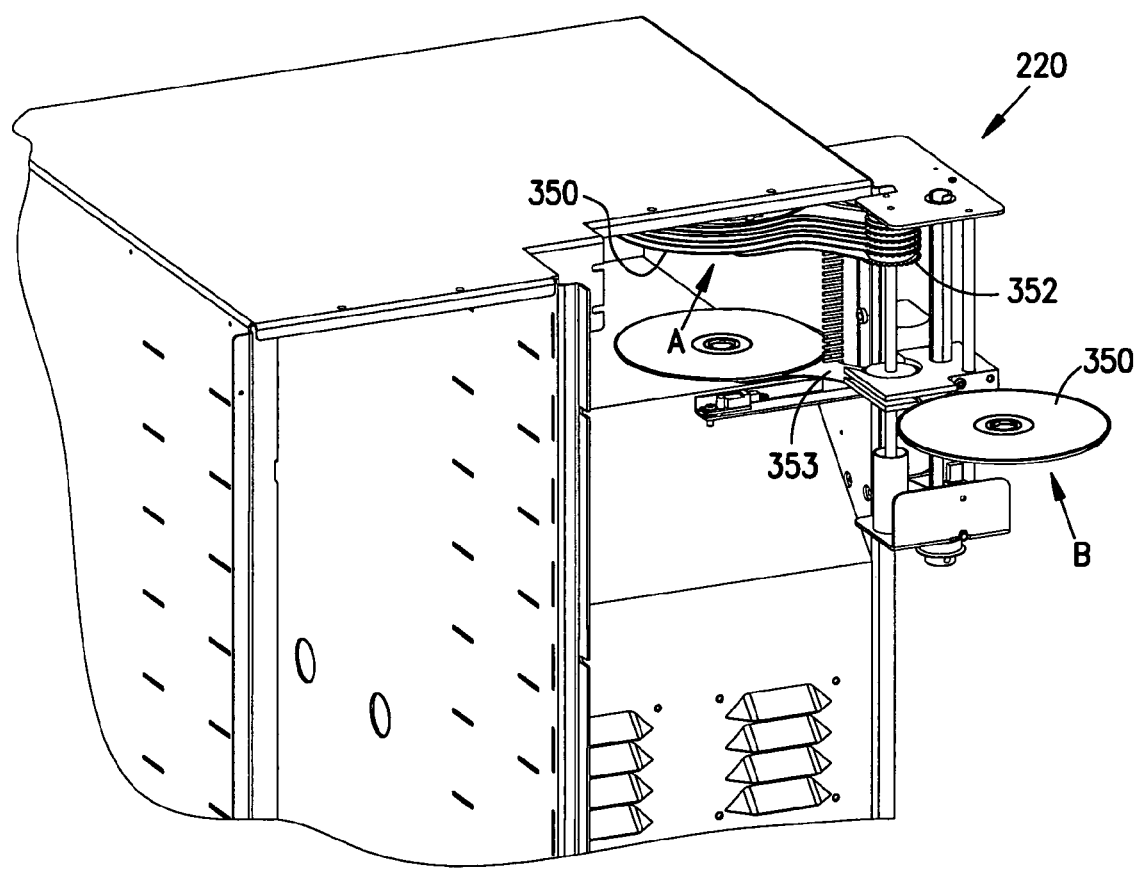
FIGS. 5 and 6 illustrate one embodiment of a disc organizer of the compact disc handler of the present invention.
Figure 6:
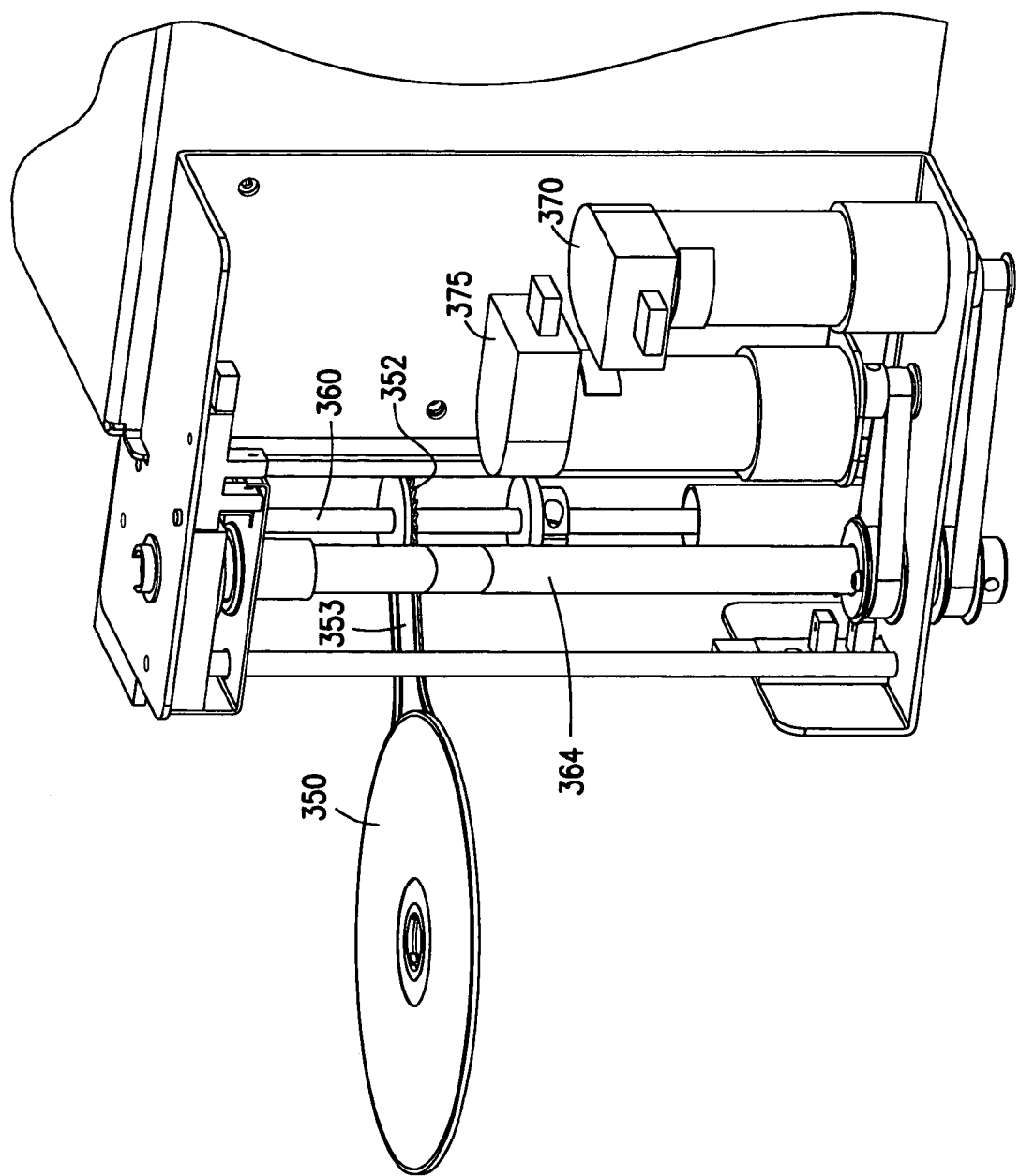

Disc organizer 220 is illustrated generally in FIGS. 5–6. FIG. 5 shows a front perspective view and FIG. 6 shows a side perspective view. The organizer can be used as either a library of original discs, or as a location to hold completed discs which need to be retrieved. FIG. 6 has been simplified to illustrate the teeth on the disc trays and does not illustrate a gear assembly used to engage the tray.

In one embodiment, the organizer has a plurality of trays 350 which can each hold a compact disc. The trays include a set of teeth 352 located at one end of arm 353. The teeth of a tray can be selectively engaged to allow the tray to rotate about shaft 360. Dual concentric shafts 364 (inner shaft not shown) are provided for selecting a disc and rotating it to one of several positions. The first position (A), FIG. 5, is a storage position where the discs are libraried. The second position (B) is an extended position to allow a user to easily access a disc located on the tray. The third position (not shown) is an intermediate position that is accessible by the gripper head 230. The second and third positions can be combined into one position in some embodiments.

The dual concentric shafts 364 are used to selectively couple one of the trays and rotate it to an extended position via teeth 352. In one embodiment, the inner shaft vertically moves a corresponding gear assembly to engage the teeth of a tray. The inner shaft is moved by servo motor 370. When the tray has been engaged, the outer shaft 364 is rotated by servo motor 375 to place the tray in a selected position. It will be appreciated that other embodiments can be practiced without departing from the present invention.

In operation, one of the trays is extended so that the gripper head 230 can either place a disc in, or retrieve a disc from the tray. Because processed compact discs are stacked together on shaft 211 (FIG. 2), a specific processed disc can be difficult to retrieve out of order. These discs can be identified during processing and placed in a tray 350 when processing is completed. A user can then retrieve the compact disc by selecting the appropriate tray. Likewise, compact discs which store master copies of data or programs can be libraried in the trays for retrieval and use by the transporter. Again, one skilled in the art with the benefit of the present description can design numerous mechanical embodiments, and the present invention is not limited to the embodiments described herein.

Figure 7:
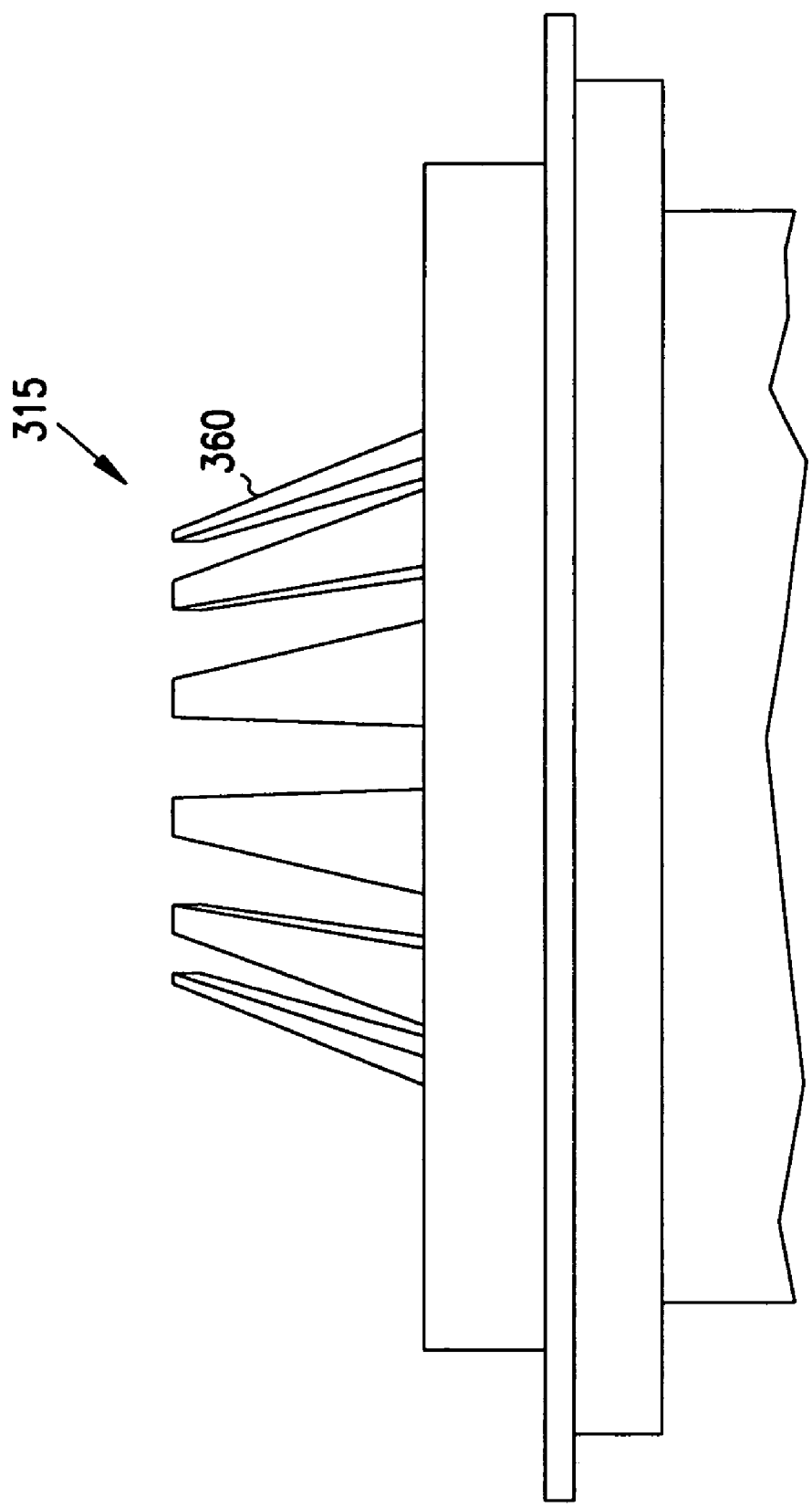
FIG. 7 illustrates one embodiment of an alignment feature of the present invention.
Figure 8A:
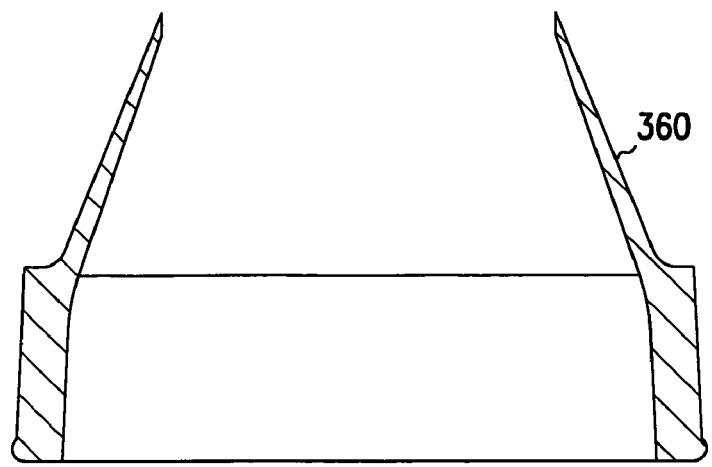
FIGS. 8A and 8B provide cross-section views of the alignment feature of FIG. 7.
Figure 8B:
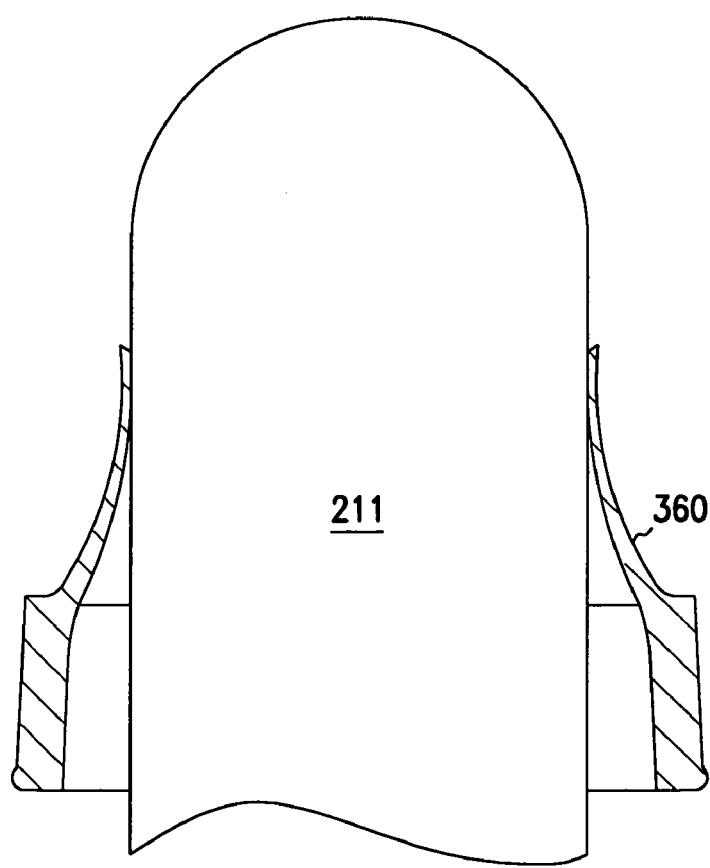

FIG. 7 illustrates one embodiment of alignment feature 315 of the present invention. The alignment feature includes a number of inwardly sloping tabs 360 that fit in a central opening of a compact disc. The tabs thereby center the disc. FIGS. 8A and 8B provide cross-section views of the alignment feature of FIG. 7. FIG. 8A show the tabs in an un-deflected state. The tabs are flexible such that they can be deflected when shaft 211 passes through gripping head 230.

CONCLUSION

A compact disc processing system has been described which allows for more efficient processing of compact discs. The system included a transporter mechanism that can grip and transport more than one compact disc at a time. As such, a second disc can be gripped while a first disc is being processed. This eliminates the need to wait for processing operations, such as recording or printing, to be completed prior to transporting the second disc. A disc organizer has also been described which includes trays that can be used to store discs for selective retrieval. The organizer eliminates the difficulty encountered in locating a processed disc from a large stack of discs.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A compact disc processing system comprising:
   a printer for printing indicia on a first compact disc;
   a recorder for recording information on the first compact disc; and
   a transporter carriage for gripping the first compact disc and moving the first compact disc between the recorder and printer, the transporter carriage comprises a single gripping head rotatable about a horizontal axis and having first and second gripping locations each for respectively gripping and directly holding the first and a second compact disc simultaneously by the single gripping head, such that the first and second compact discs are held in fixed relative positions coextensive along a common axis in different planes while the first and second compact discs are engaged by the single gripping head; wherein the transporter carriage grips the first and second compact discs using a vacuum.

2. The compact disc processing system of claim 1 wherein the transporter carriage is movable in both a horizontal and vertical direction.

3. A compact disc processing system comprising:
   a printer for printing indicia on a first compact disc;
   a recorder for recording information on the first compact disc; and
   a transporter carriage for gripping the first compact disc and moving the first compact disc between the recorder and printer, the transporter carriage comprises a single gripping head rotatable about a horizontal axis and having first and second gripping locations each for respectively gripping and directly holding the first and a second compact disc simultaneously by the single gripping head, such that the first and second compact discs are held in fixed relative positions coextensive along a common axis in different planes while the first and second compact discs are engaged by the single gripping head; further comprising a supply location having a vertically extending rod sized to fit within a central opening provided in the first compact disc.

4. A compact disc processing system comprising:
   a printer for printing indicia on a first compact disc;
   a recorder for recording information on the first compact disc; and
   a transporter carriage for gripping the first compact disc and moving the first compact disc between the recorder and printer, the transporter carriage comprises a single gripping head rotatable about a horizontal axis and having first and second gripping locations each for respectively gripping and directly holding the first and a second compact disc simultaneously by the single gripping head, such that the first and second compact discs are held in fixed relative positions coextensive along a common axis in different planes while the first and second compact discs are engaged by the single gripping head; wherein the first and second gripping locations are located on opposite sides of the gripping head and can selectively grip the first and second compact discs using a vacuum.

5. A compact disc processing system comprising:
   a supply station for gripping a plurality of blank compact discs;
   a printer for printing indicia on a first compact disc, the printer includes an extendable drawer adapted to receive the first compact disc;
   a recorder for recording information on the first compact disc, the recorder includes an extendable drawer to receive the first compact disc; and
   a transporter carriage for simultaneously gripping the first and second compact discs on first and second planes, the transporter carriage is movable in both vertical and a horizontal directions to place and pick up the first compact disc from the drawers of both the recorder and printer, the transporter carriage is movable in both vertical and a horizontal directions to pick up one of the plurality of blank compact discs held at the supply location,
   the transporter carriage comprises a pickup arm and a gripping head attached to one end of the pickup arm, the gripping head has first and second gripping locations each for respectively gripping the first and second compact discs simultaneously, such that the first and second compact discs maintain a fixed axial position while engaged by the gripping head, and the gripping head is rotatable about a horizontal axis of the pick up arm; wherein the supply station includes a vertically extending rod sized to fit within a central opening provided in the plurality of blank discs.

6. A compact disc processing system comprising:
   a supply station for gripping a plurality of blank compact discs;
   a printer for printing indicia on a first compact disc, the printer includes an extendable drawer adapted to receive the first compact disc;
   a recorder for recording information on the first compact disc, the recorder includes an extendable drawer to receive the first compact disc; and
   a transporter carriage for simultaneously gripping the first and second compact discs on first and second planes, the transporter carriage is movable in both vertical and a horizontal directions to place and pick up the first compact disc from the drawers of both the recorder and printer, the transporter carriage is movable in both vertical and a horizontal directions to pick up one of the plurality of blank compact discs held at the supply location,
   the transporter carriage comprises a pickup arm and a gripping head attached to one end of the pickup arm, the gripping head has first and second gripping locations each for respectively gripping the first and second compact discs simultaneously, such that the first and second compact discs maintain a fixed axial position while engaged by the gripping head, and the gripping head is rotatable about a horizontal axis of the pick up arm; wherein the first and second gripping locations are located on opposite sides of the gripping head and can selectively grip the first and second compact discs using a vacuum.

7. A compact disc processing system comprising:
   a printer for printing indicia on a first compact disc;
   a recorder for recording information on the first compact disc;
   a transporter carriage moveable in both a horizontal and a vertical direction, the transporter carriage comprises a gripping head that is rotatable about a horizontal axis, the gripping head includes first and second gripping locations to respectively hold the first and a second compact disc on first and second parallel planes, wherein the first and second compact discs maintain a fixed axial relation while engaged by the gripping head; and a vacuum pump coupled to the gripping head to selectively provide a vacuum to the first and second gripping locations.

8. The compact disc processing system of claim 7 wherein the vacuum pump is attached to the gripping head.

9. A compact disc processing system comprising:
a printer for printing indicia on a first compact disc;
a recorder for recording information on the first compact disc;
a transporter carriage moveable in both a horizontal and a vertical direction; and
a gripping head coupled to the transporter carriage and rotatable about a horizontal axis, the gripping head includes first and second gripping locations to respectively hold the first and a second compact disc on first and second parallel planes, the first gripping location comprises a centering feature to axially align the first compact disc with the first gripping location, wherein the first and second compact discs are held in fixed axial positions while the first and second compact discs are engaged by the gripping head; wherein the centering feature comprises a plurality of deflectable fingers which extend from the gripping head, wherein during operation the plurality of deflectable fingers extend into a central opening of the first compact disc.

10. A compact disc processing system comprising:
a printer for printing indicia on a first compact disc;
a recorder for recording information on the first compact disc; and
a transporter carriage for holding the first compact disc and moving the first compact disc between the recorder and printer, the transporter carriage comprises a single gripping head rotatable about a horizontal axis and having first and second gripping locations each for respectively holding the first and a second compact disc simultaneously, such that the first and second compact discs are held in fixed relative positions coextensive along a common axis in different planes while the first and second compact discs are engaged by the gripping head; and a compact disc organizer comprising:
a plurality of disc trays;
a selection mechanism coupled to the plurality of disc trays for selectively moving the plurality of disc trays such that the first compact disc can be placed on the selected disc tray for temporary storage; and
a supply location having a vertically extending rod sized to fit within a central opening provided in the first compact disc.

11. A compact disc processing system comprising:
a printer for printing indicia on a first compact disc;
a recorder for recording information on the first compact disc; and
a transporter carriage for holding the first compact disc and moving the first compact disc between the recorder and printer, the transporter carriage comprises a single gripping head rotatable about a horizontal axis and having first and second gripping locations each for respectively holding the first and a second compact disc simultaneously, such that the first and second compact discs are held in fixed relative positions coextensive along a common axis in different planes while the first and second compact discs are engaged by the gripping head; and a compact disc organizer comprising:
a plurality of disc trays; and
a selection mechanism coupled to the plurality of disc trays for selectively moving the plurality of disc trays such that the first compact disc can be placed on the selected disc tray for temporary storage;
wherein the first and second gripping locations are located on opposite sides of the gripping head and can selectively grip the first and second compact discs using a vacuum.

* * * * *